United States Patent Office 3,759,679
Patented Sept. 18, 1973

3,759,679
PRODUCTION OF METHANE-RICH FUEL GAS
William F. Franz, Gardiner, and Howard V. Hess, Glenham, N.Y., assignors to Texaco Inc., New York, N.Y.
No Drawing. Filed July 23, 1971, Ser. No. 165,713
Int. Cl. C01b 2/16; C07c 9/04
U.S. Cl. 48—213
9 Claims

ABSTRACT OF THE DISCLOSURE

A liquid hydrocarbon fuel is reacted with hydrogen and $H_2O$ over a nickel oxide-chromium oxide catalyst at high pressure to produce a methane-rich fuel gas. Preferably, hydrogen in the product gas is recovered and totally recycled to the reaction zone. Optionally, $CO_2$ may be removed from the product gas producing substantially pure methane.

BACKGROUND OF THE INVENTION

Field of the invention

This invention relates to the production of methane-rich fuel gas. In one of its more specific aspects, the present invention relates to a process for the production of methane.

Description of the prior art

Hydrocarbons have been reacted with steam over catalysts at comparatively low pressure i.e. less than 500 p.s.i.g. to produce principally carbon monoxide and hydrogen, and possibly a little methane. The amount of methane produced was actually further reduced when a rhenium catalyst was used and hydrogen was introduced into the reaction zone. Such results are actually opposite to the unexpected and improved results obtained by means of the subject invention.

SUMMARY OF THE INVENTION

A fuel gas mixture for transportation by pipeline to points of consumption is produced by the subject process. The product gas comprises principally methane i.e. greater than 60 mole percent (dry basis) and minor amounts of hydrogen and carbon dioxide. The gross heating value of the product gas stream is at least 700 British thermal units (B.t.u.) per standard cubic foot (s.c.f.). Optionally, additional steps are provided for separately removing $H_2$ and $CO_2$ from the product gas to produce substantially pure methane, i.e. 95 mole percent $CH_4$ or higher.

The process comprises reacting a liquid hydrocarbon fuel with hydrogen and $H_2O$ over a nickel oxide-chromium oxide catalyst in a reaction zone at a temperature in the range of about 900 to 1200° F. and at a pressure in the range of about 100 to 1000 p.s.i.g., and preferably at least 500 p.s.i.g., to produce said methane-rich fuel gas. The hydrogen supplied to the reaction zone may be selected from the group consisting of supplemental hydrogen from an external source, hydrogen separated from the product gas stream, and mixtures thereof. Preferably, substantially all of the hydrogen in the product gas stream is recovered and recycled to the reaction zone. Optionally, substantially pure methane i.e. 95 mole percent $CH_4$ or more may be separated from the methane-rich gas by conventional steps.

In one embodiment of the invention, the process gas stream leaving the reaction zone is subjected to catalytic methanation, with or without the addition of supplemental $H_2$, to convert carbon oxide impurities to additional methane.

It is therefore a principal object of the present invention to provide an efficient, economical, and continuous process for producing methane-rich fuel gas.

Another object of this invention is to produce substantially pure methane from a liquid hydrocarbon fuel.

DESCRIPTION OF THE INVENTION

The present invention involves a continuous process for reacting liquid hydrocarbons, $H_2$ and $H_2O$ at elevated pressure over a catalyst to produce a high B.t.u. fuel gas, or substantially pure methane. Since the gross heating value for methane is about 1010 B.t.u. per s.c.f. while that for CO $H_2$ are about 321 and 324 B.t.u. per s.c.f. respectively, it follows that a synthesis gas product having a high methane content is attractive for use as a fuel gas.

The methane-rich fuel gas, as produced by the process of this invention is suitable for domestic use for space heating, water heating and cooking as well as in specialized industrial applications where an exceptionally clean burning fuel is required. Further, in large scale industrial applications, such as power generation, its clean burning properties offer a clear solution to atmospheric pollution problems.

The subject fuel gas may be readily substituted for natural gas. Thus, it may be used at a significant economic advantage, in conjunction with natural gas in the same pipeline facility to offset peak loads. Further, it may be generated close to the point of use from easily stored, low cost, liquid hydrocarbon fuels.

Gas streams having a high concentration of methane, e.g., 90 mole percent or higher, such as produced by means of an embodiment of the subject invention, may be used in the organic synthesis of many chemicals. For example, methanol and formaldehyde may be made by the direct oxidation of methane. Further good yields of methyl chloride and methylene dichloride can be obtained by reacting a high ratio of $CH_4$ to Cl at 400° C.

The term liquid hydrocarbon fuel, as used herein, is intended to include various material such as liquefied petroleum gas; petroleum distillates and residue; gasoline, naphtha, kerosine, crude petroleum asphalt, gas oil, residual fuel, reduced crude, whole crude, coal tar, coal oil, shale oil, tar sand oil; aromatic hydrocarbons such as cycle gas oil from fluid catalytic cracking operation; furfural extract of coker gas oil; and mixtures thereof. Also included by definition are pumpable slurries of solid hydrocarbonaceous fuels such as coal, particulate carbon and petroleum coke in a carrier such as water, or a liquid hydrocarbon fuel such as previously mentioned; and mixtures thereof. Liquid paraffinic hydrocarbons are preferred.

$H_2O$ is charged to the reaction zone in liquid or gaseous phase, and at a temperature in the range of 700 to 1400° F., or above and preferably in the range of about 900 to 1200° F. The weight ratio of water to liquid hydrocarbon fuel is in the range of about 1 to 10, and preferably in the range of about 1 to 4 parts by weight of water per part by weight of hydrocarbon fuel. The water to carbon molar feed ratio is in the range of about 1 to 7.

While the $H_2O$ may be charged to the catalytic reaction zone as a separate stream, a preheated mixture of vaporized liquid hydrocarbon fuel and steam is preferred.

The main source of the hydrogen introduced into the reaction zone is derived from the hydrocarbon feed. However, extraneous hydrogen e.g. 98 mole percent dry basis or higher must be added to supplement this hydrogen.

The supplemental hydrogen may be derived from hydrogen separated subsequently from the process gas stream in a downstream gas separation zone and recycled to the reaction zone. The supplemental hydrogen may be substantially pure commercially available hydrogen from an external source. Supplemental $H_2$ might be obtained from a variety of other sources. Surplus hydrogen from petroleum refinery gasoline reforming might be used. Off gas from other refinery units might also be a suitable source of hydrogen. For example, offgas from a fluidized bed catalystic cracking unit (FCCU) might contain about 20% hydrogen and 75-80% light hydrocarbons. After scrubbing for sulfur removal, the gas stream could be reacted with $H_2O$ and converted to $CH_4$, $CO_2$ and $H_2$. Then in a catalytic methanation zone, additional methane would be formed from free hydrogen in the original feedstream as well as from hydrogen produced in the previous reaction. Obviously, any combination of the aforesaid sources of supplemental hydrogen may be mixed together to provide the necessary hydrogen.

The supplemental hydrogen is introduced into the catalytic reaction zone at a temperature in the range of about 700 to 1400° F., and preferably in the range of about 900 to 1200° F. About 2 to 15 moles of hydrogen are charged to the reaction zone per mole of liquid hydrocarbon fuel feed.

The general type of catalysts suitable for the reaction would be one or more metals from Group VIII of the Periodic System of Elements and the oxides thereof supported on refractory metal oxides, or on combinations of refractory metal oxides. Nickel or nickel-chromia supported on silica, silica-alumina or silica-magnesia are suitable catalysts. A nickel oxide-chromium oxide such as 16% $NiO \cdot 14\%$ $Cr_2O_3$ on diatomaceous earth is preferred.

If the liquid hydrocarbon fuel contains more than about 500 parts per million (p.p.m.) of sulfur, it is preferably removed to increase the life of the catalyst. Sulfur removal may be accomplished by any conventional procedure. For example, an electrostatic acid-treating unit can economically remove about 90% of the sulfur. The acid-treated hydrocarbon fuel is vaporized and then further desulfurized in a three step desulfurizer. The volume of liquid hydrocarbon charged to the reaction zone per hour per volume of catalyst i.e. the space velocity, is in the range of about 0.2 to 1.0, and preferably in the range of about 0.3 to 0.5.

Similarly, the volume of $H_2O$ charged to the reaction zone per hour per volume of catalyst is in the range of about 0.3 to 2.0, and preferably in the range of about 0.5 to 1.0.

The reaction takes place at a temperature in the range of about 900 to 1200° F., and preferably in the range of about 950 to 1100° F., and at a pressure in the range of about 100 to 1000 p.s.i.g., and preferably at least 500 p.s.i.g., to produce said methane-rich fuel gas.

It is postulated that the sequence of reactions taking place in the initial catalytic reaction zone is that first the hydrocarbon fuel reacts with $H_2O$ to produce a mixture of gases comprising essentially $CH_4$, $CO_2$, and $H_2$. Then, $CO_2$ in the gas mixture reacts with hydrogen to produce additional $CH_4$ and $H_2O$. By cooling the product gas mixture, $H_2O$ is condensed out and separated.

The analysis of the product gas leaving the aforesaid initial catalytic reaction zone in mole percent dry basis, and its Gross Heating Value in B.t.u. per cubic foot at 60° F. are shown below in column (2) of Table I.

TABLE I.—ANALYSIS OF PRODUCT GAS

| (1) | (2) | (3) | (4) | (5) |
|---|---|---|---|---|
| | After initial catalytic reaction | After $H_2$ removal | After $CO_2$ removal | After methanation reaction |
| $H_2$, mole percent | 30-20 | 0 | 33.3-23.5 | 0.5-2.0 |
| $CH_4$ | 60-65 | 81.3-85.7 | 66.7-76.5 | 99.5-98.0 |
| $CO_2$ | 10-15 | 18.7-14.3 | 0 | 0 |
| Gross heating value (B.t.u./cubic ft. at 60° F.) | 700-725 | 825-870 | 780-850 | 1,000-1,010 |

Optionally, the product gas leaving the initially catalytic reaction zone may be processed further in order to increase its gross heating value and to improve the economics of the process. The improvements are shown in columns (3) to (5) of Table I. In the embodiment of the invention as represented by the data in column (3), by a process to be further described $H_2$ is removed from the product gas leaving the initial catalytic reaction zone and recycled as a portion of the feed to said reaction zone. In the embodiment as shown by the data in column (4), in a gas separation zone to be further described, $CO_2$ is removed from the product gas leaving the initial catalytic reaction zone.

Any conventional gas separation zone may be used to recover hydrogen from the product gas leaving the initial catalytic reaction zone. The separated $H_2$ may be recycled to said catalytic reaction zone as a portion of the feed. $CO_2$ may be removed from the process gas stream comprising $CH_4$, $CO_2$ and $H_2$ in an acid-gas separation zone. Refrigeration and physical or chemical absorption with solvents, such as n-methyl-pyrrolidone, triethanolamine, or propylene carbonate may be used in the $CO_2$ separation process. The stream of $CO_2$ recovered has a purity of more than 98.5% and may be used for organic synthesis. Any $H_2S$ and COS may be similarly removed from the process gas stream in the acid gas separation zone. Methane may be then separated from hydrogen in the process gas stream by cryogenic purification, whereby methane is liquefied and separated at very low temperatures. The hydrogen gas may be then recycled to the reaction zone as a portion of the supplemental hydrogen in the feed.

Alternatively, hydrogen may be separated from $CH_4$ and $CO_2$ by a conventional diffusion process. Suitable diffusion membranes include palladium alloys.

Optionally, substantially all of the $CO_2$ may be converted into $CH_4$ by the initial catalytic reaction plus the catalytic methanation reaction with supplemental hydrogen from an external source. This embodiment of the invention is represented by the data in column (5).

These reactions may be illustrated for example, by Equations 1 and 2 below.

$$C_nH_{2n+2} + aH_2O \longrightarrow \left(n - \frac{a}{2}\right)CH_4 + \frac{a}{2}CO_2 + (2a-n+1)H_2 \quad (1)$$

$$\frac{a}{2}CO_2 + 2aH_2 \longrightarrow \frac{a}{2}CH_4 + aH_2 \quad (2)$$

Combining the above equations, the overall theoretical reaction may be written as follows:

$$C_nH_{2n+2} + (n-1)H_2 \longrightarrow nCH_4 \quad (3)$$

The net result is to effect a hydrocarbon hydrogenolysis to yield methane. The water charged to the system may play a quasi-catalytic role in that water consumed in the initial catalytic reaction is regenerated in the methanation section.

The catalytic production of methane by the reaction between hydrogen and carbon dioxide in the methanator is highly exothermic. Heat must be successfully removed from the catalyst bed to avoid catalyst deactivation and low methane yields. Temperature control may be effected by distribution of the feed-gas stream throughout fixed multi-fed or fluidized-bed reactors by means of separate inlet points, embedding tubular coolers in the catalyst beds and producing steam which may be used elsewhere in the process, and by cooling the effluent gas between beds.

The Group VIII transition elements, mainly iron, nickel, and cobalt, appear to be the most suitable for use as methanation catalysts. Typical commercial preparations contain about 33 to 78 weight percent of nickel oxide and about 12 to 25 percent aluminum oxide and are used in the form of 3/8" x 3/8" or 1/4" x 1/4" cylindrical tablet. A typical nickel oxide catalyst is Girdler G65 produced by Chemetron Corp. Suitable catalyst compositions include the following: $NiO-Al_2O_3$ or NiO-MgO precipitated on kaolin and reduced with hydrogen; and also in parts by weight Ni 100, $ThO_2$, 6, MgO 12, and kieselguhr (diatomaceous earth) 400 reduced with hydrogen for 2 hours at 752° F. followed by heating for 100 hours at 932° F. The life of the catalyst may be extended by maintaining the sulfur level in the reactant gases below about 0.005 grain of sulfur per thousand standard cubic feet. Carbon deposition on the catalyst may be minimized by maintaining in the process feed gas a high mole ratio $H_2/CO_2$ in the range of 3.5 to 5.5 and preferably at least 4. The operating temperature in the methanator is in the range of about 390 to 1000° F. For example the preferable exit temperature for the aforesaid $NiO-Al_2O_3$ catalyst is about 662° F. Space velocities range from 100 to 10,000 standard volumes of gas per volume of catalyst (hr.$^{-1}$) and pressures range from 1 to 250 atmospheres. Preferably, the pressure is the same as in said initial catalytic reaction zone less ordinary line drop.

The effluent gas from the methanation catalytic reactor comprises from about 70 to 75 volume percent of methane or higher. Any water in the effluent gas stream may be condensed out leaving substantially pure methane (99 volume percent).

EXAMPLES OF THE PREFERRED EMBODIMENT

The following examples are offered as a better understanding of the present invention, but the invention is not to be construed as limited thereto.

Example I 54.7 cubic centimeters per hour (cc./hr.) of normal heptane were mixed with about 1.05 s.c.f. per hour of hydrogen gas and 134.7 cc. per hr. of distilled water at a temperature of 950° F. The aforesaid hydrogen gas was comprised of about 0.87 s.c.f. per hr. i.e., substantially all of the hydrogen recovered from the product gas stream, and about 0.16 s.c.f. of supplemental hydrogen from an external source. About 4 moles of hydrogen were charged to the reactor per mole of liquid hydrocarbon fuel feed. The water to carbon molar feed ratio was about 2.0. The feed ratio, i.e. grams $H_2O$ per gram liquid hydrocarbon fuel, was about 2.5.

The aforesaid feed mixture was introduced into a catalytic reaction zone comprising a chamber containing 16% $NiO \cdot 14\%$ $Cr_2O_3$ on diatomaceous earth, e.g. kieselguhr. The combined space velocity for the liquid hydrocarbon fuel and water charged was 0.94 volume per hour per volume of catalyst (v./hr./v.). The temperature in the reaction zone was 957° F. and the pressure was 500 p.s.i.g.

Complete conversion of the hydrocarbon feed to gaseous products was obtained at these conditions. 3.90 s.c.f. per hr. of off-gas were removed from the reaction zone having a heating value of about 722 B.t.u. per s.c.f. at 60° F. This methane-rich fuel gas product had the following analysis in volume percent dry basis: $CH_4$ 64.0, $H_2$ 22.4, and $CO_2$ 13.6. The $CH_4$ yield, basis percent theoretical yield, was 86.0.

To obtain hydrogen for the reaction, the off-gas from the reaction zone may be introduced into a conventional gas separation zone. Substantially all of the recovered hydrogen may be recycled to the reaction zone in admixture with supplemental hydrogen from an external source, as previously described. In such case, the product gas stream has a heating value of 835 B.t.u. per s.c.f. at 60° F. and the following analysis in volume percent dry basis: $CH_4$ 82.5, $CO_2$ 17.5. Optionally, substantially all of the $CO_2$ may be removed in a conventional gas separation zone leaving substantially pure methane i.e. at least 98 mole percent $CH_4$, dry basis having a heating value of about 1000 B.t.u. per s.c.f. at 60° F.

Example II

To illustrate the advantages of the process described in Example I, hydrogen was omitted from the feed to the reaction zone. To compensate for this, the heptane rate was increased to 0.4 v./hr./v. so as to maintain the contact time nearly equivalent to that of the previously described conditions in Example I. The water charge was also increased to maintain the water to carbon molar feed ratio at about 2. The combined liquid hydrocarbon and water space velocity was 1.03 v./hr./v. The feed ratio, grams $H_2O$ per gram of liquid hydrocarbon fuel, was 2.39. The catalyst was the same.

At the same conditions of temperature and pressure i.e. 950° F. and 500 p.s.i.g., 1.78 s.c.f. per hr. of product gas was produced having a heating value of about 680 B.t.u. per s.c.f. at 60° F. and the following analysis in volume percent. $CH_4$ 59.5, $H_2$ 21.4, $CO_2$ 17.8, CO 0.9, $C_3H_8$ 0.1, $C_3H_6$ 0.1, i-$C_4H_{10}$ 0.1, $C_4H_8$ 0.1.

The aforesaid gas analysis shows a lower methane and higher carbon dioxide content, and the presence of other impurities in the gas stream e.g. CO, $C_3$, $C_3$=etc. compared to methane-rich fuel gas obtained in Example I. These differences in composition indicate that in the subject invention feed hydrogen was consumed to form methane from the carbon oxides. Further, the heating value and the yield of 86 percent of the theoretical seven moles of methane per mole of normal heptane feed as obtained by the subject process in Example I are substantial improvements over that obtained in Example II. This illustrates the increased yield, basis carbon in the feed. By the subject invention, more carbon in the feed is converted into the desired methane.

Example III

In another embodiment of the process, the methane-rich fuel gas leaving the reaction zone is mixed with 2.6 s.c.f. per hr. of supplemental hydrogen from an external source. The gas mixture is then introduced into a catalytic chamber containing $NiO-Al_2O_3$ methanation catalyst. At a temperature of 600° F. and a pressure of 500 p.s.i.g., all of the carbon oxides in the methane-rich fuel gas are reacted with hydrogen to produce methane and $H_2O$. The process gas stream is cooled to condense out the water, leaving about 3.0 s.c.f. per hr. of substantially pure methane i.e. 98.5 mole percent.

Obviously many modifications and variations of the invention as hereinbefore set forth may be made without departing from the spirit and scope thereof, and only such limitations should be imposed as are indicated in the appended claims.

We claim:

1. A process for producing methane-rich gas comprising
   (a) introducing into a single stage reaction zone containing 16% $NiO \cdot 14\%$ $Cr_2O_3$ catalyst on diatomaceous earth the following reactants: liquid hydrocarbon fuel, supplemental hydrogen, and water, wherein the volume of liquid hydrocarbon fuel introduced per hour per volume of catalyst is in the range of about 0.2 to 1, the volume of water introduced per hour per volume of catalyst is in the range of about 0.3 to 2.0, the mole ratio of supplemental hydrogen per mole of liquid hydrocarbon fuel is in the range of about 2 to 15, and the weight ratio of water to liquid hydrocarbon fuel is in the range of about 1 to 10;
   (b) catalytically reacting said reactants in said reaction zone at a temperature in the range of about 900 to 1200° F. and a pressure of at least 500 p.s.i.g.; and
   (c) withdrawing from said reaction zone methane-rich product gas comprising at least 60 mole percent methane (dry basis), hydrogen, and carbon oxides.

2. The process of claim 1 further provided with the steps of separately removing substantially all of the $CO_2$ and $H_2$ from said stream of methane-rich product gas in a gas separation zone.

3. The process of claim 1 further provided with the steps of introducing said methane-rich product gas into a catalytic methanation zone, and reaction therein the carbon oxides and hydrogen to produce additional methane.

4. The process of claim 1 further provided with the step of desulphurizing said liquid hydrocarbon fuel prior to introducing said material into said catalytic reaction zone.

5. The process of claim 1 wherein said liquid hydrocarbon fuel is selected from the group consisting of liquefied petroleum gas, crude petroleum, asphalt, gas oil, residual fuel, reduced crude, whole crude, coal tar, coal oil, shale oil, tar sand oil, cycle gas oil from fluid catalytic cracking operations, furfural extract of coker gas oil, pumpable slurries of solid hydrocarbonaceous fuels selected from the group consisting of particulate carbon and petroleum coke in a carrier selected from the group consisting of water and liquid hydrocarbon fuel, and mixtures thereof.

6. The process of claim 1 provided with the additional steps of separating hydrogen from the methane-rich product gas from step (c) and recycling said hydrogen to the reaction zone in step (a) as at least part of said supplemental hydrogen.

7. The process of claim 1 wherein said liquid hydrocarbon fuel is a petroleum distillate selected from the group consisting of gasoline, naphtha and kerosine.

8. The process of claim 1 wherein said liquid hydrocarbon fuel is normal hexane.

9. The process of claim 1 wherein said liquid hydrocarbon fuel and water are charged into said catalytic reaction zone as a preheated mixture of vaporized liquid hydrocarbon fuel and steam at a temperature in the range of about 700 to 1400° F.

References Cited
UNITED STATES PATENTS

| | | | |
|---|---|---|---|
| 3,468,641 | 9/1969 | Gross et al. | 48—213 X |
| 3,415,634 | 12/1968 | Dent et al. | 48—213 |
| 3,444,099 | 5/1969 | Taylor et al. | 48—214 X |
| 3,642,460 | 2/1972 | Thompson | 48—213 X |
| 3,481,722 | 12/1969 | Pfefferle | 48—213 X |
| 3,421,871 | 1/1969 | Davies | 48—214 |
| 3,019,096 | 1/1962 | Milbourne | 48—213 |

JOSEPH SCOVRONEK, Assistant Examiner

U.S. Cl. X.R.

48—196 FM, 197 R, 199 FM, 214; 260—449 M